(12) United States Patent
Engwall et al.

(10) Patent No.: US 7,141,191 B2
(45) Date of Patent: Nov. 28, 2006

(54) TRIPLE PURPOSE LAY-UP TOOL

(75) Inventors: Dwight L. Engwall, Haysville, KS (US); John F. Costello, Derby, KS (US)

(73) Assignee: The Boeing Company, Chicago, IL (US)

( * ) Notice: Subject to any disclaimer, the term of this patent is extended or adjusted under 35 U.S.C. 154(b) by 385 days.

(21) Appl. No.: 10/428,454

(22) Filed: May 2, 2003

(65) Prior Publication Data
US 2004/0217497 A1 Nov. 4, 2004

(51) Int. Cl.
*B29C 70/30* (2006.01)
(52) U.S. Cl. ............ 264/40.1; 264/139; 264/155; 264/156; 264/169; 264/238
(58) Field of Classification Search ........... 264/139, 264/156, 163, 238, 40.1
See application file for complete search history.

(56) References Cited

U.S. PATENT DOCUMENTS

| | | | |
|---|---|---|---|
| 5,100,255 A | 3/1992 | Rule et al. | 403/205 |
| 5,746,553 A | 5/1998 | Engwall | 409/132 |
| 6,012,883 A | 1/2000 | Engwall et al. | 409/132 |
| 6,168,358 B1 | 1/2001 | Engwall et al. | 409/219 |
| 6,314,630 B1 | 11/2001 | Munk et al. | 29/407.01 |
| 6,478,922 B1 * | 11/2002 | Rosevear et al. | 156/297 |
| 6,702,911 B1 * | 3/2004 | Toi et al. | 156/93 |

* cited by examiner

*Primary Examiner*—Edmund H. Lee
(74) *Attorney, Agent, or Firm*—Thomas F. Lebens; Fitch, Even, Tabin & Flannery

(57) ABSTRACT

The present invention provides a method and apparatus for use in manufacturing a composite part includes molding a composite part on a lay-up tool, machining a sacrificial portion of a first surface for securing a first hardware device with the composite part while the part is on the lay-up tool and cutting the part forming a peripheral edge while the part is on the lay-up tool. The method can further include positioning the first hardware device in contact with a machined interface of the composite part and machining the part including drilling a plurality of positioning holes through the hardware device and the part while the part is on the lay-up tool. The machining can include machining the sacrificial portion creating a machined interface and positioning the hardware device on the machined interface.

16 Claims, 12 Drawing Sheets

TRIPLE PURPOSE LAY-UP TOOL

The present invention relates generally to the manufacturing and construction of composite parts, and more particularly to lay-up tools on which composite parts are sculpted, bonded and tooled, and on which hardware is aligned and mounted to the composite part without removing the part from the lay-up tool.

BACKGROUND OF THE INVENTION

Composite parts have become commonly used throughout industry because of their engineering qualities and low weight. However, despite the recognized benefits of this type of parts and their wide use, they are relatively expensive, in part because the manufacturing processes for producing these parts remain clumsy and difficult to use, contributing high reject and rework rates for composite parts.

Previous processes for making composite parts require the construction and/or formation of the part in a bond assembly jig (BAJ). If the part has a core, the core is applied on the BAJ. Once the core is bonded onto the part, the part is removed from the BAJ and inserted into a bond mill fixture (BMF) tool. The BMF allows the core to be shaped into a desired configuration through cutting of the core. Once cut to the desired configuration, the part is returned to the BAJ to complete the formation or construction of the composite part by applying a final layer or layers of ply, for example, plies of resin-impregnated fiberglass or graphite cloth. The formed part is again removed from the BAJ and again inserted into the BMF. In the BMF the part can be shaped to a final desired shape through a final trimming.

Typically, composite parts are used in cooperation with other components and/or composite parts. For example, in the aerospace industry, composite parts are used as housings for engines and other structures of aircrafts. As such, many composite parts require additional hardware to be fixed to the composite part to allow the composite part to cooperate with other parts. As such, once the composite part is finally trimmed to the desired shape, the part is removed from the BMF and inserted into yet a third tool, a fixture assembly jig (FAJ). Again this FAJ tool has to be specially designed to coordinate with the BAJ and the BMF used in manufacturing the composite part. Once secured in the FAJ, the hardware devices are tool located and hand mounted to the composite part. The tool locating and the hand mounting result in inaccuracies and inconsistency because of tolerance build-up or accumulation between tools.

This process is time consuming and costly. It requires the use of three separate tools which are very costly, especially for large parts, and it requires much hand manipulation of the part during removal from and positioning onto the three tools.

The present invention advantageously addresses the above and other needs.

SUMMARY OF THE INVENTION

The present invention advantageously addresses the needs above as well as other needs by providing an apparatus and method for use in the construction, formation and/or assembly of composite parts. In one embodiment, a method for use in manufacturing a composite part includes molding and/or forming a composite part on a lay-up tool, machining at least one sacrificial portion of a first surface for securing a first hardware device with the composite part while the composite part is on the tool and cutting the composite part forming a peripheral edge while the composite part is on the tool. The method can further include positioning the first hardware device in contact with the composite part and drilling a plurality of securing holes through the first hardware device and the composite part while the composite part is on the lay-up tool. The step of machining can further include machining the sacrificial portion creating a machined hardware interface that coordinates with the first hardware, such that when positioning the first hardware device the first hardware device is positioned on the machined interface of the first surface.

In an alternative embodiment, the present invention provides a method for use in manufacturing a composite part that includes forming a composite part on a lay-up tool, machining at least one portion of a first surface for securing a first hardware device while the composite part is on the lay-up tool, and cutting the composite part forming a peripheral edge while the composite part is on the lay-up tool. The method can further include positioning the first hardware device in contact with the composite part, and wherein the machining includes drilling a plurality of positioning holes through the first hardware device and the composite part while the composite part is still on the lay-up tool.

In some embodiments, the present invention provides a method for use in fabricating and assembling a composite part. The method comprises molding a composite part on a lay-up tool having a desired shape, machining a sacrificial portion of the first surface creating a machined interface while the composite part is still on the lay-up tool, positioning a first hardware device in contact with the machined interface of the first surface and drilling a plurality of securing holes into the first hardware device and the composite part while the composite part is still on the lay-up tool. The method can further include cutting the composite part while the composite part is still on the tool by guiding a cutter on a predefined path and cutting a peripheral edge of the composite part.

In another embodiment, the invention can be characterized as an apparatus used for making and machining a composite component. The apparatus comprises a tool body having a facing surface configured to a desired shape of one surface of a composite part to be made on the tool, a supporting structure configured to support the tool body to maintain the facing surface in the desired shape, a probe configured to determine a position of the tool body, a machining device configured to machine a sacrificial portion of a surface of the composite part while the composite part is still on the tool body creating a machined hardware interface, a drill configured to drill a plurality of holes into the composite part, and is some embodiment, through at least one hardware device and the part while the at least one hardware is positioned in contact with the machined interface of the composite part, and a controller coupled with the probe, the machining device and the drill, wherein the controller is configured to guide the probe, machining device and drill to defined locations of the tool body and composite part.

A better understanding of the features and advantages of the present invention will be obtained by reference to the following detailed description of the invention and accompanying drawings, which set forth illustrative embodiments in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE PREFERRED EMBODIMENTS

Figure 1:
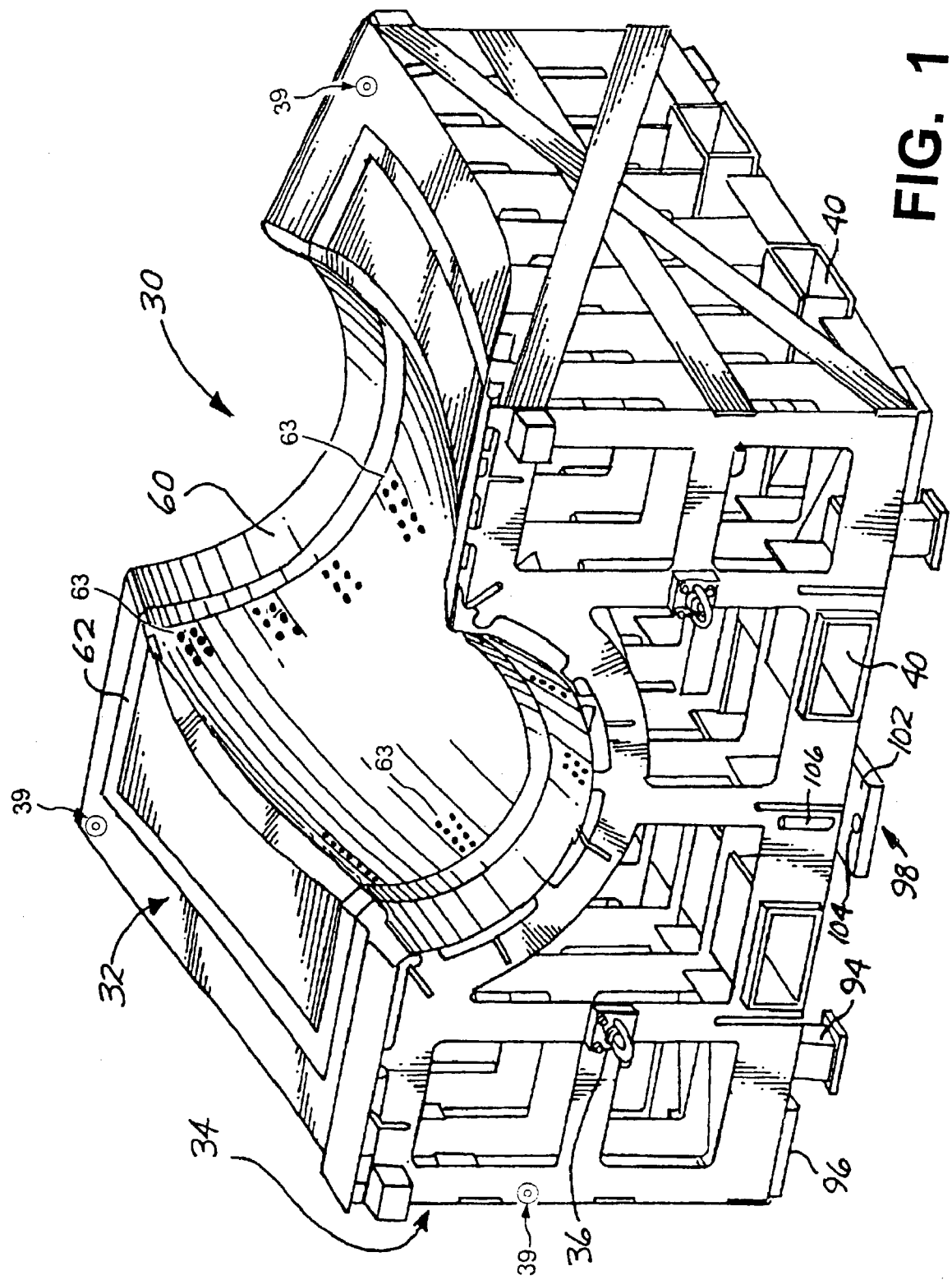
FIG. 1 is a perspective view of a dual purpose lay-up tool in accordance with one embodiment of the present invention.

The present invention provides a method and apparatus for use in forming, constructing and/or assembling a composite part. The present invention allows a composite part to be formed, machined, tooled, hardware to be positioned and machined with the composite part, and sculpting of the composite part all in a single apparatus. The method and apparatus can be used to manufacture and construct composite parts for any number of industries, including aerospace, automotive, manufacturing and other industries. The present invention greatly improves accuracy and consistency of the manufacturing, constructing and assembling of the composite component, simplifies the positioning and tooling of the hardware, and achieves this in a reduced time and at reduced costs.

The composite part or component formed, tooled and assembled can be substantially any part. For example, the part can be a component of an airplane manufactured to specific guidelines and tolerances. Similarly, the composite part can be for substantially any type of device utilizing composite parts including, but not limited to, vehicles (cars, tractors, trucks), trains, satellites, military equipment and vehicles, building materials and other similar devices and material utilizing composite components.

In previous methods for the construction of composite components, for example a panel of an airplane, a three stage process was required where the composite component is initially formed through a bond assembly jig (BAJ) device. Once constructed, the component is removed from the BAJ and transferred from the BAJ to a bond mill fixture (BMF) device to sculpt of the component into a desired shape. Following the sculpting the component is then removed from the BMF and moved to a fixture assembly jig (FAJ) device. The FAJ positions and secures the sculpted component to allow the positioning and securing of hardware components (hinges, latches, and such) to the composite component.

All three separate devices (BAJ, BMF and FAJ) must be precisely configured to receive and retain the component. Each device must precisely match the other devices to ensure accurate manufacture and construction of the composite component. Further, these devices are often very large to provide for the manufacture and assembly of large parts (e.g., aircraft panels). As such, these separate devices are very expensive adding cost to the construction and manufacture of the components.

Further, the removal of the composite component from one device (e.g., BAJ) to be positioned into the next device (e.g., BMF) introduces errors and inaccuracies due to mis-alignment. In an attempt to minimize these inaccuracies, the transfer from device to device requires additional alignment steps to be taken within each device adding time and complexity to the manufacture and construction process. However, mis-alignments continue to occur.

In previous construction methods, hardware to be positioned, mounted and secured to a composite component is positioned, mounted and secured by hand. For example, in constructing some composite panels for airplanes, hardware (e.g., hinges, latches, keepers and other hardware) is positioned in contact with the panel. This hardware must be precisely positioned and secured within precise guidelines with little room for error. In previous construction methods, the composite component is mounted within the separate FAJ and then the composite component is manually secured and shimmed by hand to allow the hardware to be mounted.

The hardware to be mounted to the composite component is secured to the FAJ in alignment with, and in contact with the composite component. A technician or operator positions the component and the hardware in the FAJ by hand. As such, the positioning by hand of the hardware results in inconsistent placement from component to component.

Because of the way the composite component is manufactured, the surface upon which the hardware is mounted is typically not uniform. As a result, gaps exist between the surface of the composite component and the hardware. In many industries, for example in the manufacture of airplanes, these gaps must be filled to ensure an accurate, secure and flush mounting of the hardware. Consequently, a person must, by hand, determine the size of gaps resulting between the component surface and the hardware. The person then hand cuts one or more shims to be positioned within the gaps to fill the gaps. Typically, these shims are formed from layered material where a person hand cuts the shim to fit the gap and strips layers to achieve what the person believes is the best fit, or stacks a plurality of shims to fill the gap. Filling a single gap can take several iterations to achieve a satisfactory fit, and there is typically a plurality of gaps to be filled for each piece of hardware. This shimming process must be repeated for each piece of hardware to be secured with the panel.

Once positioned and shimmed, a person then spot drills by hand pilot holes into the composite component corresponding to a plurality of mounting or securing holes pre-drilled within the hardware. Typically, the pilot holes are not drilled completely though the component. Once pilot holes are drilled for each securing hole of the hardware, the hardware is unsecured and removed.

A person then continues to hand drill completely through the component. Often the person uses a drill guide in an attempt to maintain a strait drill hole. However, because the holes are hand drilled, even with a drill guide, the holes are inconsistent and typically very in size. As such, the person must then measure each drilled hole with a hole gage to determine if the hole size is within predefined limits. If it is too large, then the hole must be re-drilled by hand to generate an oversize hole. The oversize hole later requires an oversize fastener, bolt or other securing means to be used when the hardware is assembled and mounted to the component.

Each piece of hardware to be mounted and secured to the composite component must go through this process. This process results in inconsistent final products and is very time consuming. Further, if the inconsistencies exceed predefined parameters, complex steps must be taken to correct the inconsistencies or the component is thrown away resulting in a large costs due to wasted materials, time and man hours. Not to mention that a new component must be manufactured to replace the trashed component through the same process with the same inconsistencies.

The present invention, alternatively, provides a triple purpose lay-up tool that is configured to allow for the construction, molding and/or forming of the composite component or part, the precise positioning and tooling of the composite part and the hardware, and the machining or tooling of the composite part to sculpt the part to a desired shape and provide for simplified and precise mounting of hardware components.

FIG. 1 depicts an elevated view of a simplified schematic diagram of a triple purpose lay-up tool 30. The lay-up tool serves the purpose of-a form on which constituent materials are applied to for bonding or curing on the tool into a composite part in a desired configuration. The lay-up tool also maintains the part in the originally applied position to allow machining for the precise positioning of hardware to be later fixed with the composite part, and for holding the part in the original position during subsequent machining of a peripheral edge of the part.

The lay-up tool includes a top plate or face sheet 32 supported by a support structure 34. The top plate 32 typically has a coefficient of thermal expansion that matches that of the constituent materials of the composite part, particularly the layer placed in contact with the top plate referred to as the tool-side skin.

The support structure 34 may be any suitable design capable of supporting the part during formation, assembly and tooling as well as supporting hardware and the securing of the hardware with the composite part. The support structure can be constructed with the conventional "egg crate" design shown in FIG. 1. The egg crate can be constructed of metal, wood, composite material, composite tubes attached together with fittings shown in U.S. Pat. No. 5,100,255, the disclosure of which is incorporated herein by reference, or other similar configurations. The support structure 34 has transport accessories to facilitate movement of the lay-up tool 30 in the factory, such as lift rings 36 on the front and back sides, alternatively or additionally fork lift tubes 40.

Figure 2:
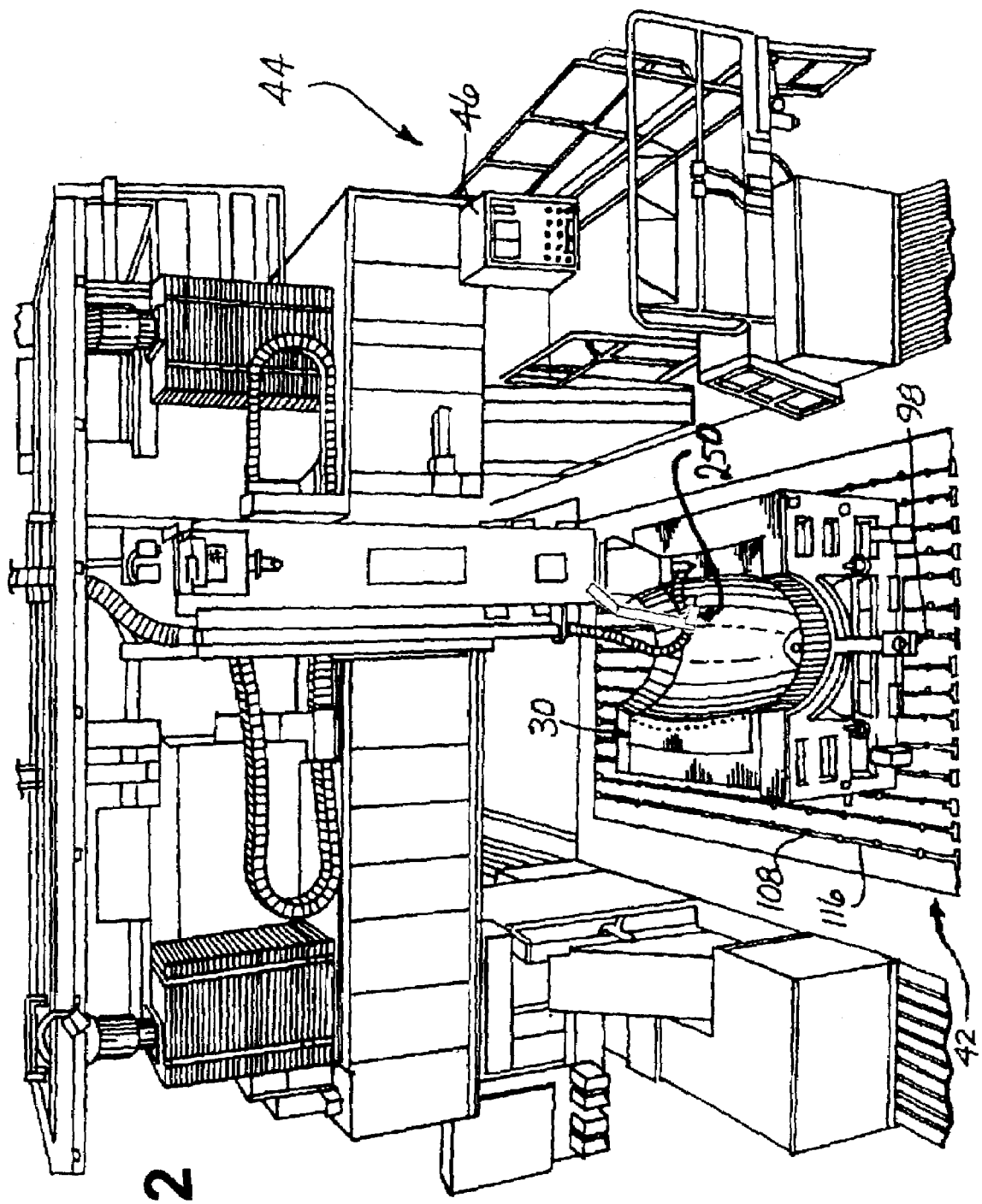
FIG. 2 is a perspective view of a dual purpose lay-up tool indexed to the base of a gantry mounted machine tool.

Location and attachment devices are provided on the support structure 34 for accurately indexing and positioning the lay-up tool 30 on a base 42 of a machine tool such as a five-axis gantry machine tool 44 shown schematically in FIG. 2, and for fastening the support structure 34 to the machine tool bed 42 in the desired position. The machine tool 44, under control by a machine tool controller 46, performs machining operations on the composite part laid up on the lay-up tool 30 after the part is cured. The location and attachment devices facilitate precise positioning of the lay-up tool 30 on the bed 42 so the machine tool controller can drive the machine tool to the correct position for accurate machining of the part and the proper alignment and mounting of the hardware.

The location devices can include set points, sine keys, tool balls and other similar devices or combination of devices. Use of these devices makes it possible to position the lay-up tool 30 on the base 42 of the machine tool with extreme accuracy and to check that position and adjust the machine control and/or program to conform to the actual position of the top plate 32 of the tool 30, thereby facilitating accuracy in the subsequent machining, aligning and mounting operations, since the position of the lay-up tool 30 and the part laid-up thereon are known accurately. Further, the lay-up tool can include probe or positioning points 39 that allow the machine tool 44 to probe the lay-up tool 30 to obtain a precise three dimensional location of the tool 30 and the composite part.

The attachment devices by which the lay-up tool 30 is secured to the machine tool bed 42 may be any conventional devices known in the art for fastening a work piece to the bed of a machine tool. In one embodiment, the attachment devices are conventional toe clamps, the design of which is known to those skilled in the art.

The top plate 32 has an upper upwardly facing surface 60 on which the constituent elements of the composite part are laid-up, such as resin-impregnated fiberglass, graphite cloth or other similar elements. The upper surface 60 of the lay-up tool is configured to a desired shape of one surface of the composite part to be made on the lay-up tool. Upwardly opening recesses are machined into the upper surface 60 of the top plate 32 at positions corresponding to locations on the part that machining operations are required later in the manufacturing process.

The recesses include groove 62, such as a peripheral groove, located on the top plate 32 where the peripheral edge of the part can be cut, and counter drill wells or recesses located on the top plate 32 where holes can be drilled through the composite part 220. Other continuous grooves 62 are located within the top plate where edges or openings are to be cut out of the composite part. Some of the various shapes of recesses are illustrated in FIG. 4. The grooves and/or recesses receive a sacrificial material 64 (see FIG. 3) on which the constituent materials forming the composite part 220 can be laid up on the top plate 32 flush with the upper surface 60.

Figure 3:
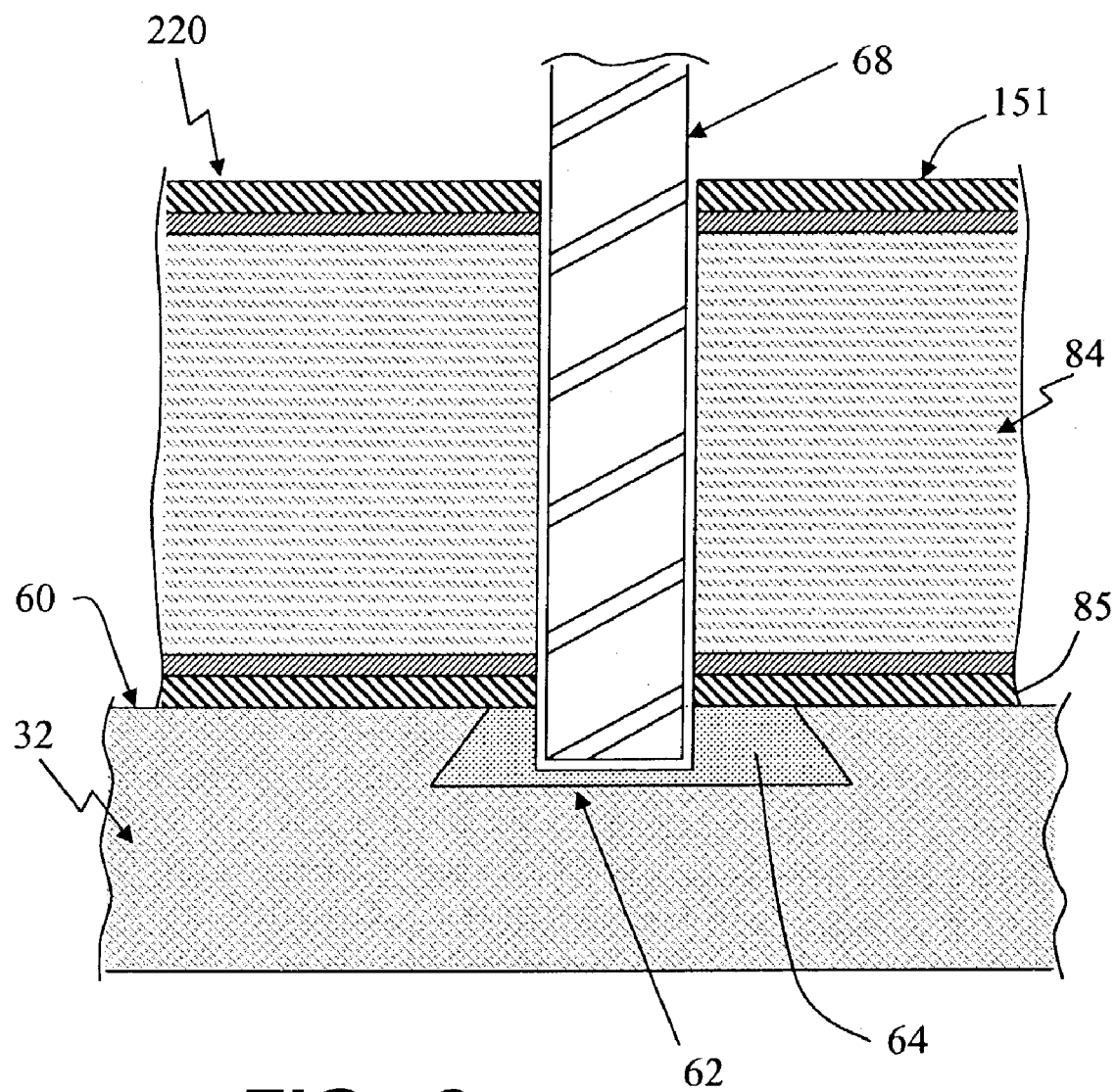
FIG. 3 is a cross-sectional view of a portion of a composite part positioned on a lay-up tool with a cutter cutting the composite part while still mounted in an original position on the lay-up tool.
Figure 4:
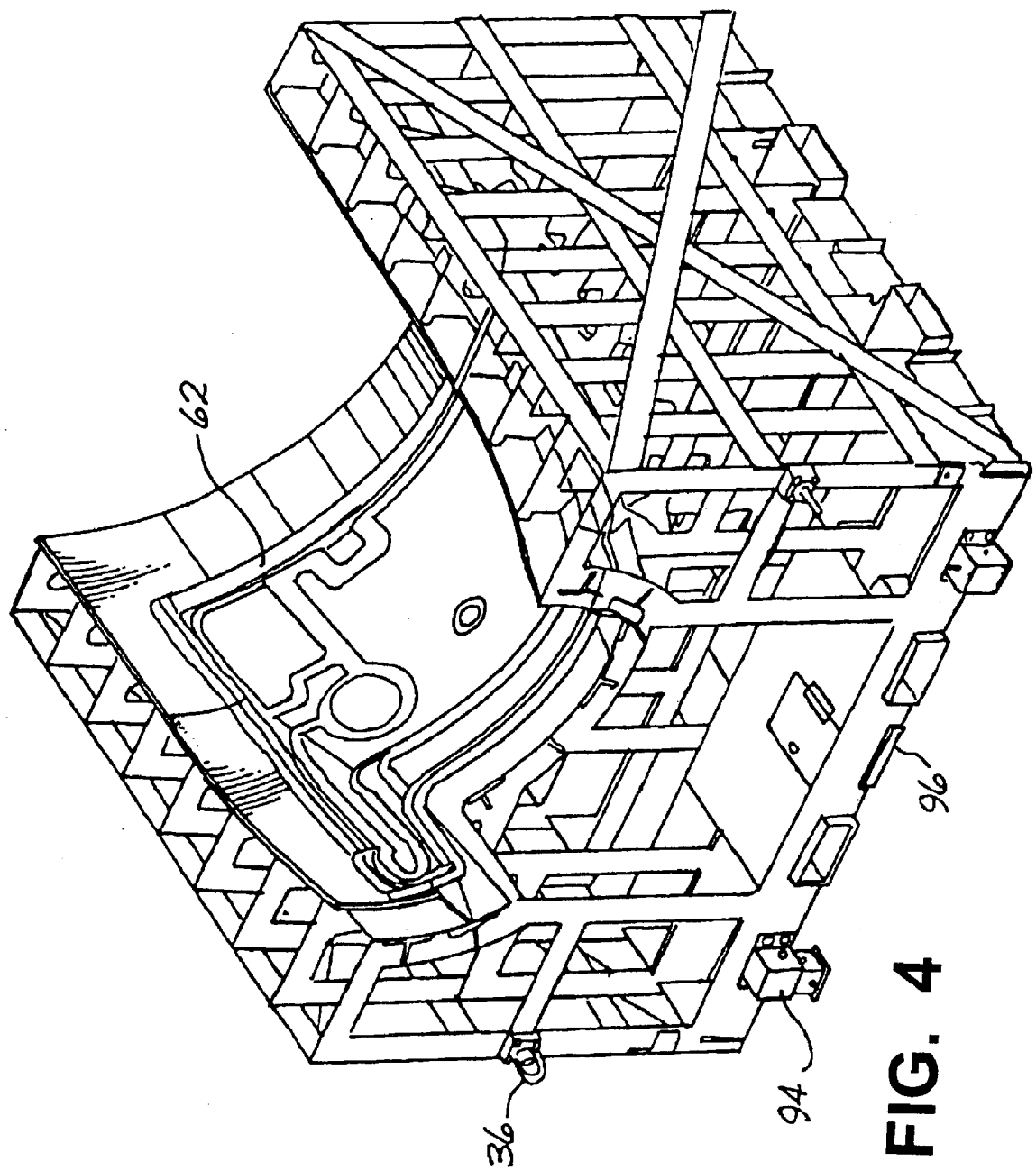
FIG. 4 is a perspective view of a lay-up tool in accordance with one embodiment of the present invention, showing recesses in the top plate of the lay-up tool for various cutouts.

In one embodiment, the groove 62 is preferably dovetailed in cross-section as shown in FIG. 3 which assists in retaining the sacrificial foam, graphite, glass or other similar material in the groove until it is removed. After curing, the foam material has a strength, for example a strength of about 500 PSI, that is sufficiently strong to provide a supporting surface that holds the tool-side plies flush with the surface of the tool top plate 32 under normal circumstances. However, if greater strength is desired, one or more plies of graphite/epoxy prepreg tape may be added in the groove 62 over the sacrificial material 64 to provide a more rigid surface that is capable, when cured, of distributing the load over a larger surface and thereby carrying a greater load. To facilitate removal of the sacrificial material 64 from the groove 62 after the composite part is removal from the lay-up tool, a separate strip of resin-impregnated fabric may be inserted into the groove 62 prior to applying the sacrificial material therein.

In one embodiment, a peripheral groove 62 extends completely around the central portion of the facing surface 60 of the top plate 32 on which the constituent elements of the composite part are to be laid up, in an area of the surface where the net edge trim is to be located. Other recesses are located in areas on the lay-up tool where holes are to be drilled through the part or where other machining through the part is required. Typically, the outer peripheral groove is a continuous groove in the sense that it completely encircles the area on which the part is laid up. However, there may be particular part designs that require a break or a gap in the groove.

Preferably, the groove 62 is just deep enough to enable a mill cutter 68 to extend below the facing surface 60 during its cutting pass so that its peripheral cutting teeth can engage and cut the full thickness of the peripheral edge of the part. The depth of the groove 62 in this embodiment is about 0.050", although it could be shallower or deeper depending on the machine tool utilized.

The width of the groove 62 is selected to accommodate the diameter of the cutter 68 plus the necessary tolerance in the path of travel of the cutter 68 in the machine tool 44. An additional width of groove 62 is also provided on both sides of the kerf cut by the cutter 68 for holding the tool-side surface of the laid-up materials bonded to the sacrificial material 64 to ensure that the part does not shift during the cutting operation but remains securely fixed in place on the top plate 32 until the cutting operation is completed and the part is ready to be removed from the tool 30.

The sacrificial material 64 can be any suitable material that can be conveniently applied to fill the holes and/or groove 62 and has sufficient strength, temperature resistance and other properties to support the constituent materials during the bonding/curing operation. The preferred material used in this embodiment is B.F. Goodrich #PL657 heat expandable self-skinning foam. It can be applied as a bead or a cut strip in the groove 62 and covered with a smooth molded caul sheet. Vacuum tracks may be molded into the underside of the caul sheet by laying a bead of sealing tape. The sacrificial material 64 is expanded and cured in the holes and/or grooves by covering the holes and/or groove with the caul sheet and a vacuum bag, and sealing the edges of the vacuum bag to the facing surface 60 of the top plate 32 with putty-like sealing tape known in the art for this purpose. The vacuum bag is evacuated to a vacuum of about 10 inches of vacuum and vacuum is applied in the vacuum tracks to help hold the caul sheet down against the top surface 60 of the tool over the groove 62 while the foam expands against the underside of the caul sheet over the groove 62 and then cures in the expanded condition.

One or more plies of the tool-side skin 85 of the composite part 220 are applied to the tool face 60, overlapping the groove 62 and typically extending a distance beyond the groove, as shown in FIG. 3, to provide an excess or selvage. A release coating can be previously applied to the tool face 60 to ensure that the composite part will not adhere to the tool face. Other elements, such as a core material, honeycomb core elements 84 or other elements can be fit in place on top of or between the tool-side skin ply(s) 85 and outer surface ply(s) 151. The core can be secured with an adhesive, such as an expanding foam.

Referring back to FIGS. 1–4, in assembling the composite part, a vacuum bag is typically laid over the tool-side skin plies 85, core, other plies, other elements and the outer surface plies 151, and the space under the vacuum bag is evacuated by a vacuum pump. The lay-up tool 30 is transferred to an autoclave where pressure and heat causing the preimpregnated resin in the plies to flow and then cure while any out gassing from the curing resin is evacuated through the vacuum line.

The lay-up tool 30 is then transported to the machine tool bed 42. A datum surface 96 on the underside of the support structure 34 engages with the machine tool bed 42. This establishes the vertical position of the facing surface 60 of the lay-up tool 30 from the machine bed 42, which is a distance that is known to the machine program that controls the movement of the gantry mounted machine tool 44.

The position and orientation of the lay-up tool 30 on the machine bed 42 are established by location devices, including a set point 98 and a sine key (not shown). A precision ground pin 106, such as a 2 inch diameter pin, fits with a close sliding fit in the hole 104 of the plate 102 (see FIG. 1) and into a selected one of numerous holes 108 in the machine bed 42, shown in FIG. 2. The sine key positioned on an opposite side of the lay-up tool 30 and includes a plate, similar to a plate 102 of the set point 98, fixed to the underside of the support structure 34. A vertical hole receives an accurately ground pin, such as a $^{13}/_{16}$ inch diameter pin, that extends down beyond the plate and fits into the same T-slot 116 in the machine tool base 42 in which the hole 108 is centered. When the pins 106 are in place in the plates and tool bed 42 the position of the lay-up tool 30 is uniquely positioned on the machine tool base 42.

The tool position can be input to the machine tool control program or determined by the control program by identifying the slot 116 and the hole 108 in which the pins are positioned. That information, together with a tool configuration data set and part configuration data set input into the machine tool controller 46, provides sufficient information to enable the machine tool controller to guide the machine tool to perform the machining, cutting and other operations. However, typically, the machine tool controller further initiates further measurements to verify exact lay-up tool and composite part location. The location measurements can be performed through a probe and/or other measurement devices, such as a laser measurement device.

Figure 5:
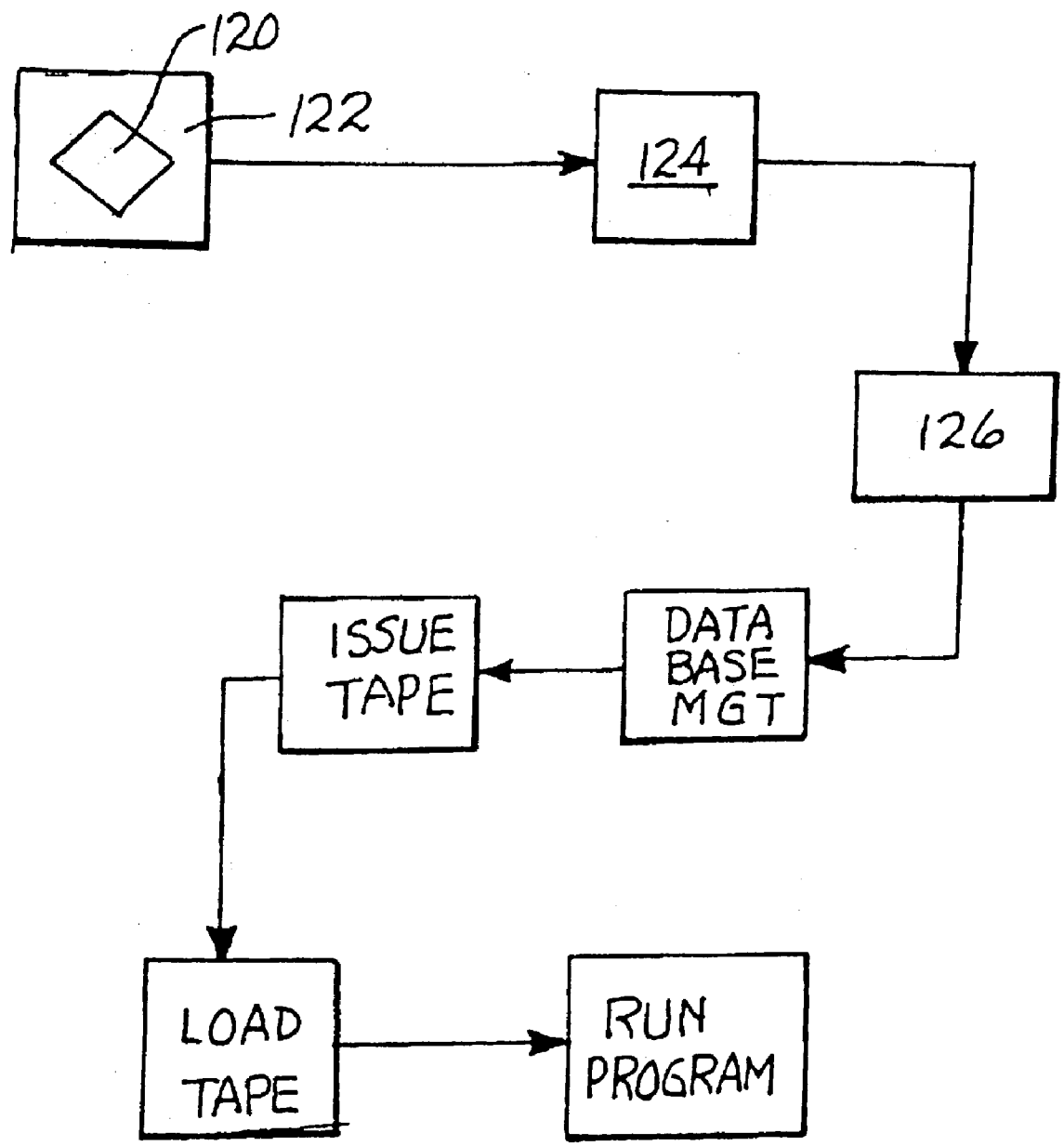
FIG. 5 is a block diagram illustrating a process of translating digital date from a digital part model to a form usable by the machine tool controller.

FIG. 5 depicts a simplified flow diagram of a process for transforming digital part data into machine instructions that can be understood and used by the controller of the machine tool 44 to enable it to perform the desired machining operations on the part such as measuring, machining, drilling, edge routing and other similar functions. A digital part model 120 resident on a master computer 122 is provided to a numerically controlled (NC) machine program 124 using the part model 120. The NC machine program is processed through a post processor 126 and that program is logged into a data base management system for storage and retrieval. The program is retrieved when ready to make the part. The program is loaded into the machine tool controller to perform the machining and other operations on the part after the lay-up tool and composite part are properly mounted on the machine tool base 42 and probed to confirm its position.

Some composite parts include cores that may require that separate core assemblies be made apart from the tool-side skin and then be mated with or between the tool-side skin and/or the bag-side skin, and co-cured together. For such parts, the core can be formed separately on the same or a similar lay-up tool 30. A single ply of graphite epoxy is laid on the surface 60 of the lay-up tool and the elements of the core, such as honeycomb core, are laid atop the tool-side ply. Strips of foam material such as the B.F. Goodrich #PL657 material are inserted between the foam core elements. A vacuum bag is laid over the assembly, evacuated, and the temperature and pressure are elevated for the cure cycle.

After the core element has been formed and cured, the lay-up tool 30 used to form the core is taken to the machine tool 44 and mounted on the machine tool bed 42 and indexed in place. The lay-up tool and core positioning are determined through probing and/or other measurement techniques, described fully below. The core element is machined to produce the sculpted shape desired for the part in which it is to used, and the periphery of the core element is cut following the peripheral groove 62 to free the core element from the lay-up tool. A vacuum tool can be used to remove dust and debris from the core cells after machining. The sculpted and machined core element is removed and mounted on a tool-side skin in the same or another tool 30. Again, the core is typically bonded with the tool-side skin and/or other plies. The bonding can be through adhesive. A bag side skin is applied over the core element and a vacuum bag is laid over and sealed to the lay-up tool. The vacuum bag is evacuated and the lay-up tool is put in an autoclave for co-curing both skins simultaneously.

Figure 6:
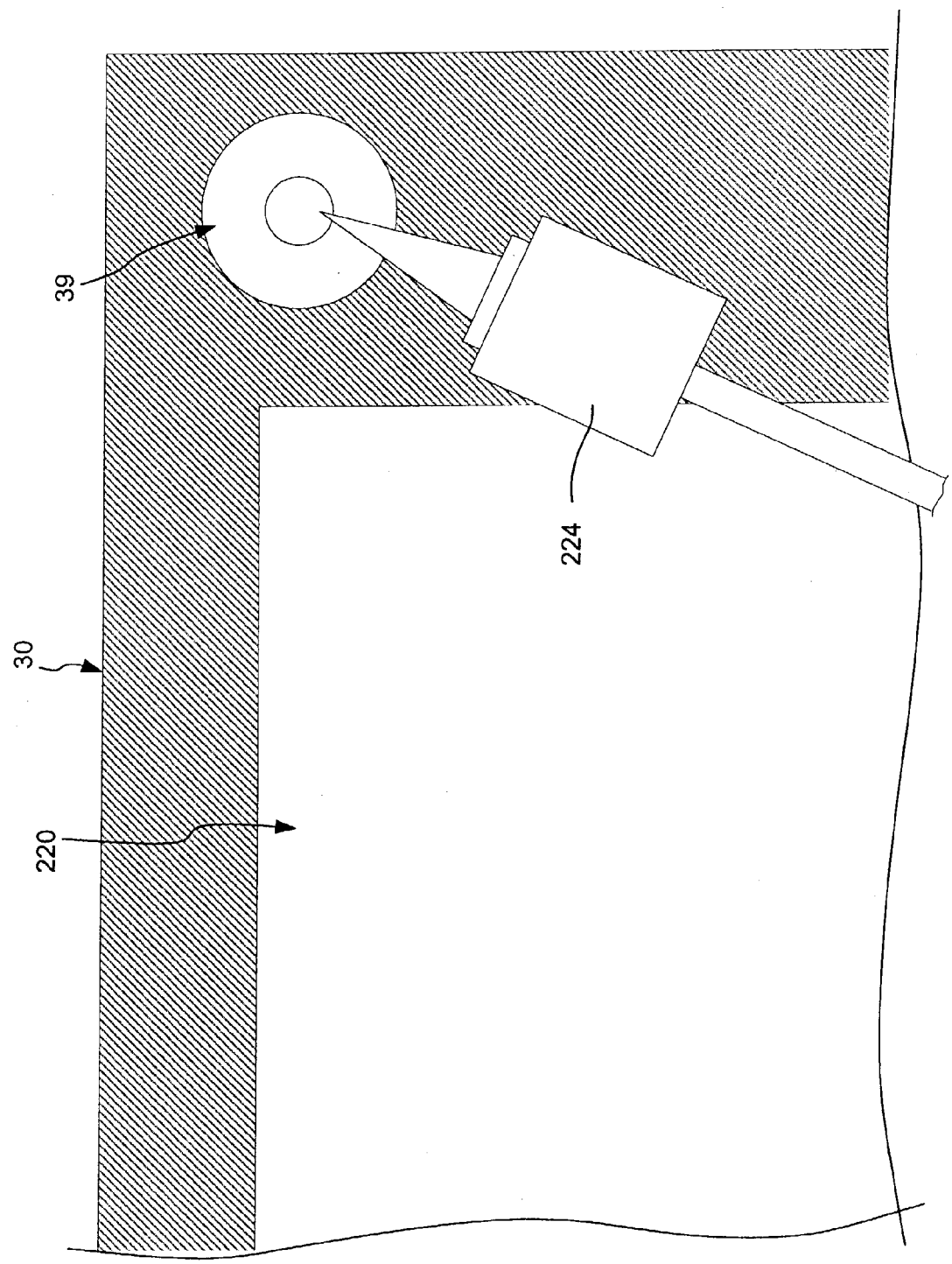
FIG. 6 depicts a simplified cut-out, elevated view of a composite part formed within a lay-up tool of the present invention with a probe probing a location or positioning point.

Once the composite part 220 is molded or formed within the lay-up tool 30, the tool is transported and positioned on the machine tool bed 42. The precise positioning of the tool 30 and composite part 220 within the machine tool 44 is then verified. In one embodiment, a probe is used to probe the lay-up tool and/or composite part to determine and verify precise positioning. FIG. 6 depicts a simplified, elevated view of a portion of the composite part 220 formed within a lay-up tool 30 with a probe 224 probing a location or positioning point 39.

Referring to FIGS. 2 and 6, a probe 224 is used to precisely determine the location of the lay-up tool and composite part 220. Utilizing the location information known from the pin placements into the machine bed 42 and/or other measurement devices (e.g., laser measurement device) the controller 46 controls the probe 224 to determine precise locations of one or more positioning points 39 on the tool 30. Typically, the tool 30 includes a plurality of positioning points 39 precisely fixed in predefined locations on the lay-up tool. The positioning points on the tool allow the controller to collect and determine a three dimensional position of the lay-up tool 30 and composite part 220 relative to the machine tool 44, tool bed 42 and machining components of the machine tool 44.

In one embodiment, the controller further implements a measurement device to measure tool flexure, such as compression of a curvature in the lay-up tool 30 or an expansion of a curvature in the tool. In one embodiment, a laser measurement tool is utilized to verify flexures and/or fluctuations in the lay-up tool structure. Having probed the lay-up tool 30 and part 220, the precise location of the lay-up tool and part are known. With the laser measurement tool, the controller can determine small deflections of the lay-up tool 30 from normal or ideal. As such, when machining is performed on the part (as described below), the controller can compensate for the deflections to ensure machining is performed within defined tolerances.

With the accurate positioning information and flexure of the lay-up tool known, the controller 46 determines a zero reference for X, Y and Z coordinates. Once zeroed, the controller can implement the control program with precision according to the exact positioning of the lay-up tool 30 and composite part 220.

Due to the bag side skin being in contact with the bag during heating and curing, the bag side skin typically is not uniform or smooth. This is due to the fact that the bag, during evacuation, creases and wrinkles. The creases and wrinkles cause ridges and variations on the bag side skin. Additionally, an accumulation of tolerance errors from the multiple layers used to construct the composite part 220 can further result in an uneven surface and/or variations in the surface. Previous techniques addressed these ridges and variations by manually shimming by hand the gaps between the bag side skin and the hardware to be fixed to the composite part 220 to fill the gaps.

Alternatively, the present invention avoids the need for shims, as well as the cost and time to generate and install the shims, by machining sacrificial plies formed on the bag side skin or outer ply(s) 151 to eliminate the ridges and/or variations in at least those regions where hardware is to be secured.

Figure 7:
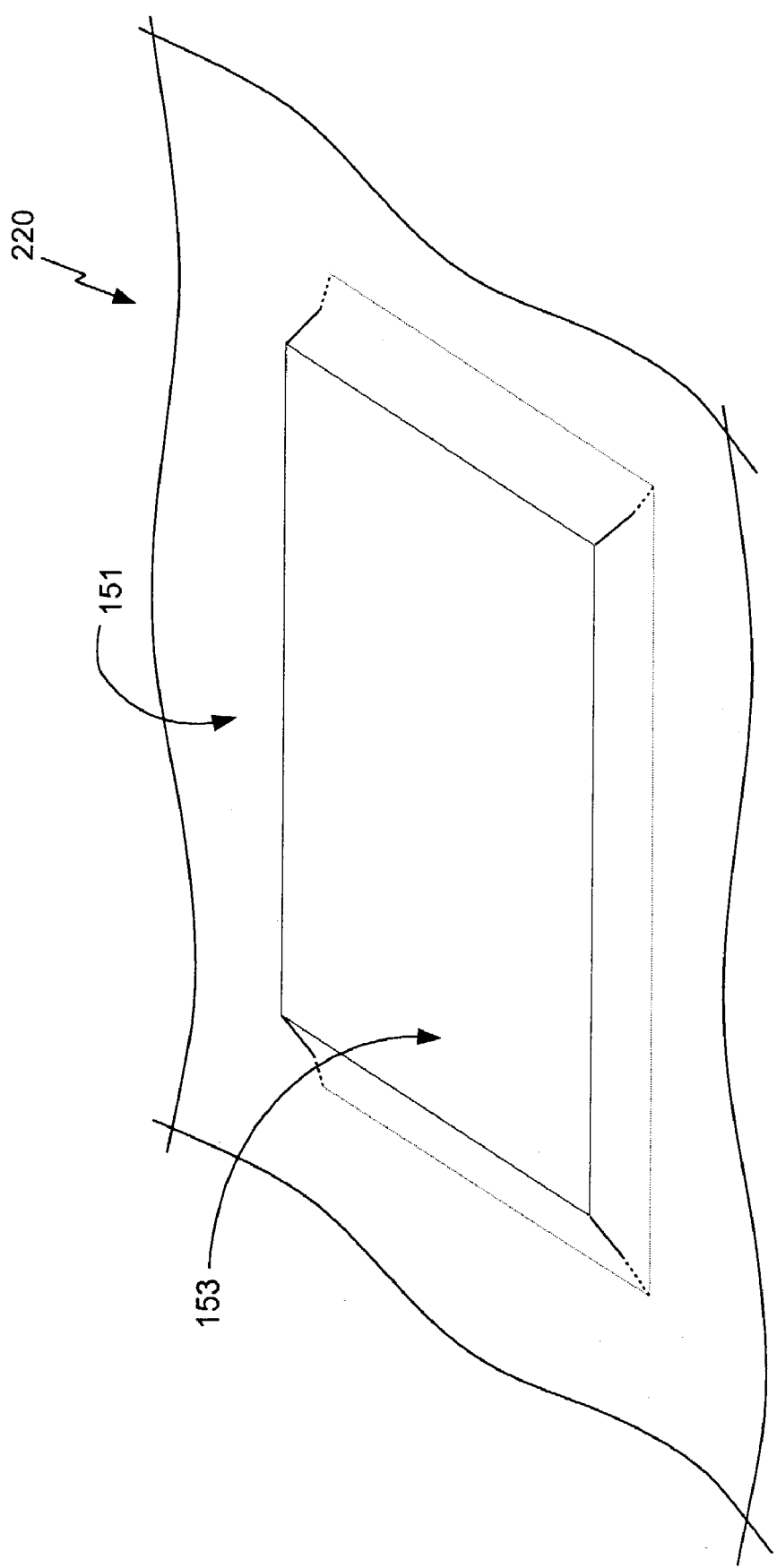
FIG. 7 depicts a simplified elevated view of a region of an outer layer ply of the composite part with a sacrificial portion or interface.

Referring to FIG. 7, predefined sacrificial regions or portions of an outer layer ply 151 of the composite part 220 are built up by applying additional ply material and/or resin in those regions. For example, one or more fiberglass ply pads can be added to build up the region. FIG. 7 depicts a simplified elevated view of a region of an outer layer ply 151 of the composite part 220. The region includes a built-up, sacrificial portion 153 which has a greater thickness and extends away from the upper surface 60 of the lay-up tool 30. This sacrificial portion 153 allows for the composite part 220 to be later machined or tooled to establish a smooth and/or shaped machined hardware interface 152 (see FIG. 8). This sacrificial region 153 is added to the composite part 220 to at least in part compensate for inconsistencies and variations in the out surface 151, as described below.

Before machining of the part 220, the controller or an operator guides the probe 224 to measure or probe the one or more built-up or sacrificial portions 153 (see FIG. 7) of the composite part. In one embodiment, the probe measures at least one point on the sacrificial portion and at least one point in an area directly surrounding the sacrificial portion to determine a difference in height and thus a thickness of the sacrificial portion. Once probed, the thickness of the sacrificial portion 153 is verified or altered to achieve a defined interface 152 (see FIG. 8).

The machining of the sacrificial region or interface is not begun until it is verified that the machining will not cause damage to the part 220. For example, if the thickness does not exceed a predefined threshold, the machining could penetrate beyond protective layers and into a core. If the thickness is inadequate, further steps are taken to compensate. In one embodiment, additional plies and/or resin are applied to further thicken the area. Because the composite part is maintained within the lay-up tool 30, the addition of further plies and/or resin is not complicated. The lay-up tool can simply be removed from the machining tool bed 42, additional plies and/or resin can be applied, then heated and cured. In some embodiments, the additional plies and/or resin can be applied while the lay-up tool 30 is still on the machine tooling bed 42 by applying an electrically heated caul sheet. Once it is verified that machining will not damage the part 220, the controller guides a machining device 230 to the sacrificial portions.

Figure 8:
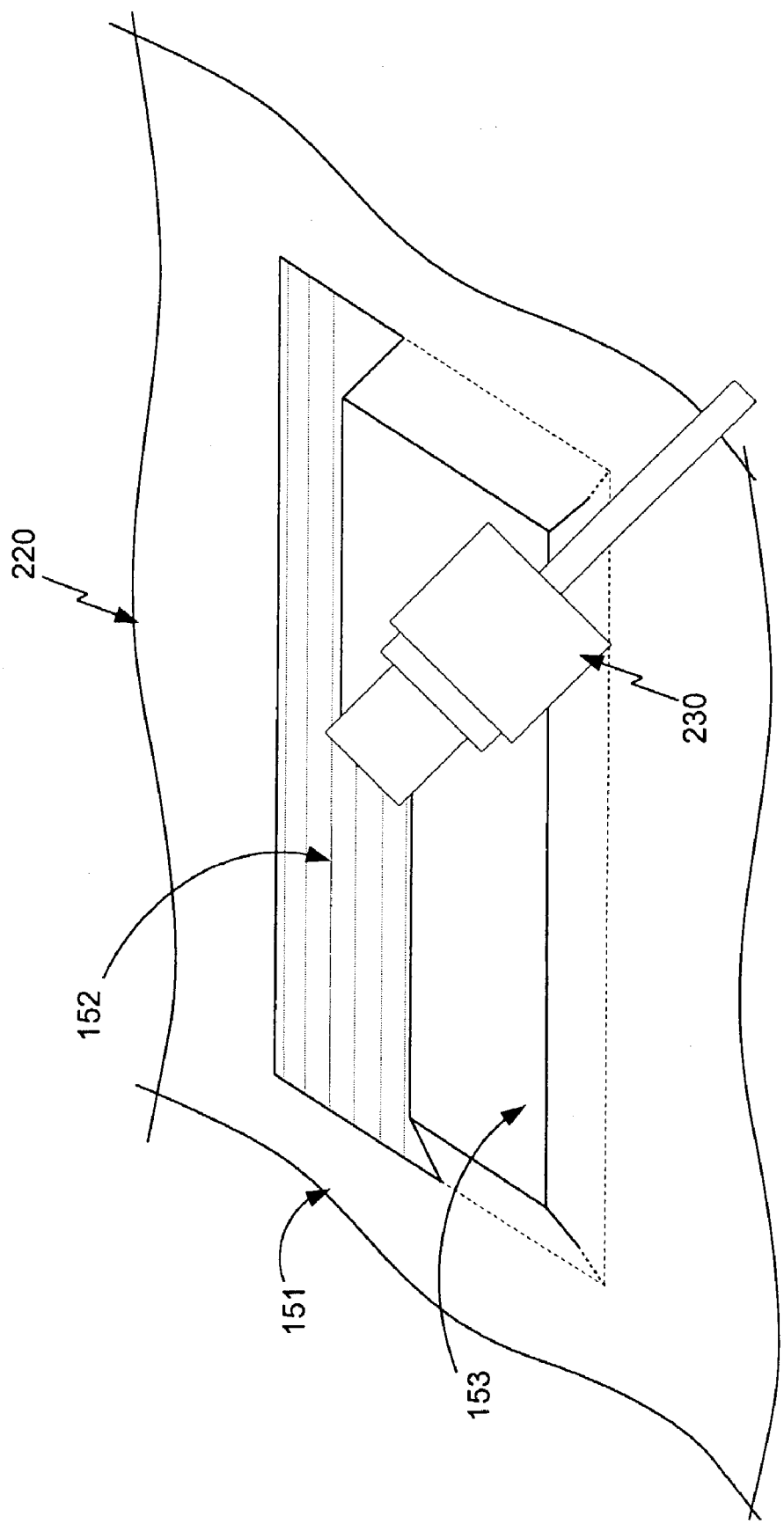
FIG. 8 depicts a simplified cut-out, elevated view of a portion of a composite part with the build-up, sacrificial portion shown in FIG. 11 and a machined interface tool that machines the sacrificial portion.

FIG. 8 depicts a portion of the composite part 220 with a sacrificial portion 153 and a machining device 230 machining the sacrificial portion to obtain a machined hardware interface 152. The controller 46 (see FIG. 2) precisely controls the machining tool 230 to machine the surface of the sacrificial portion 153 to coordinate with the surface of the hardware to be mounted with the composite part at the machined hardware interface 152. Machining the surface results in a previously defined machined interface 152, and is typically digitally defined. The machined interface 152 allows hardware to be mounted directly on the machined interface to achieve a desired, and typically a flush contact between the hardware and the interface surface of the composite part 220. The machining does not require the surface to be a flat plane. The surface can be machined to be curved, have several curves, be grooved, be flat or have other contours. The surface of the machined interface 152 is simply machined to the desired shape to correspond with the shape of the hardware to be mounted and secured in that location on the composite part. In some embodiments, the sacrificial portion 153 can also be machined to include ridges or other similar structures that mate with ridges or structures on the hardware to provide a more stable and secure fitting of the hardware.

The machining of the surface of the composite part eliminates the need for shimming. Because the surface is shaped and/or smoothed, there are minimal and preferably no gaps between the interface surface and the hardware. Therefore, shimming is not needed to fill gaps. This saves significant amounts of time in the production, manufacturing and assembly of the final product. Further, by shaping the machined interface and avoiding the use of shims, a better and more stable fit is achieved.

Once the machined interface of the composite part has been machined, the controller guides the probe to re-probe the sacrificial region 153 and machined interface 152 to ensure that the machined area of the composite part has a desired thickness according to the predefined parameters. If one or more of the measured areas are still too thick, the controller guides the machining device 230 to further machine the surface.

In one embodiment, knowing the precise location of the lay-up tool 30 and composite part, through probing, the controller guides a drill to precisely drill a plurality of positioning holes within the composite part. Typically, at least two positioning holes are drilled for each hardware component that is to be mounted and secured with the composite part.

Figure 9:
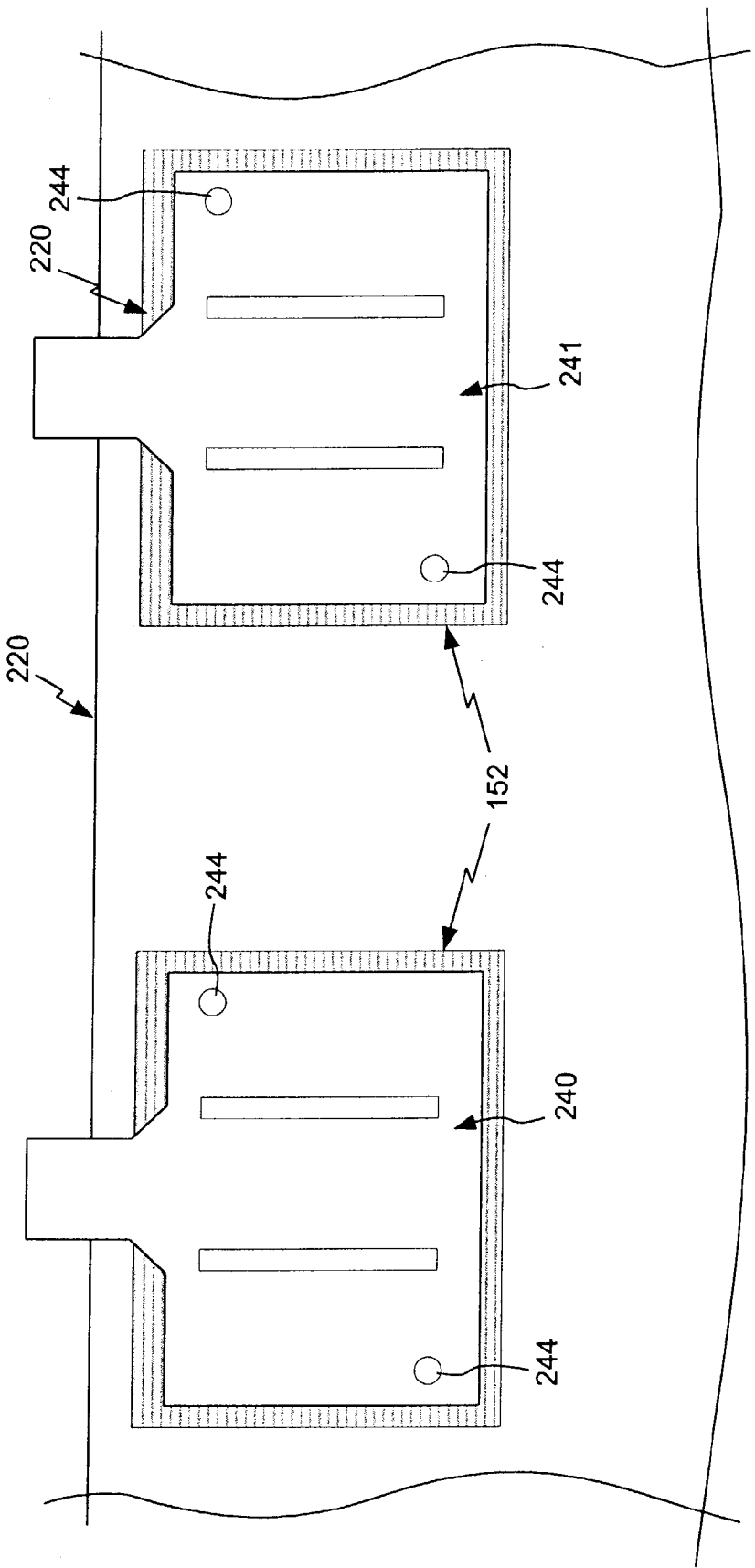
FIG. 9 depicts a simplified block diagram of two hardware devices positioned on and in contact with two machined hardware interfaces of a composite part.

One or more hardware components, for example a plurality of hinges, latches, keepers and substantially any other similar hardware are then positioned in contact with the machined hardware interface 152. FIG. 9 depicts a simplified block diagram of two hinges 240, 241 positioned on and in contact with two machined interfaces 152 of a composite part 220.

The hinges are positioned on the composite part 220 in alignment with the positioning holes 244. Typically, the hardware also has pre-drilled positioning holes 244 that are drilled in previously defined locations to within precise tolerances. The pre-drilled positioning holes correspond and align with the positioning holes 244 drilled into the machined interface 152. In an alternative embodiment, the hardware 240, 241 can be precisely positioned on the interface 152 and the positioning holes 244 can be match drilled through both the hardware and the composite part 220.

Once positioned, the hardware 240, 241 are secured to the composite part 220 with temporary fasteners. For example, the fasteners can be bi- or quad-lock temporary fasteners that are removeably secured within the positioning holes 244. The fasteners secure and fix the hardware 240, 241 with the composite part 220. The quad-lock fasteners include four prongs that extend into the holes to secure, center and align the positioning holes of the composite part with those of the hardware, and thus the hardware on the composite part.

Figure 10:
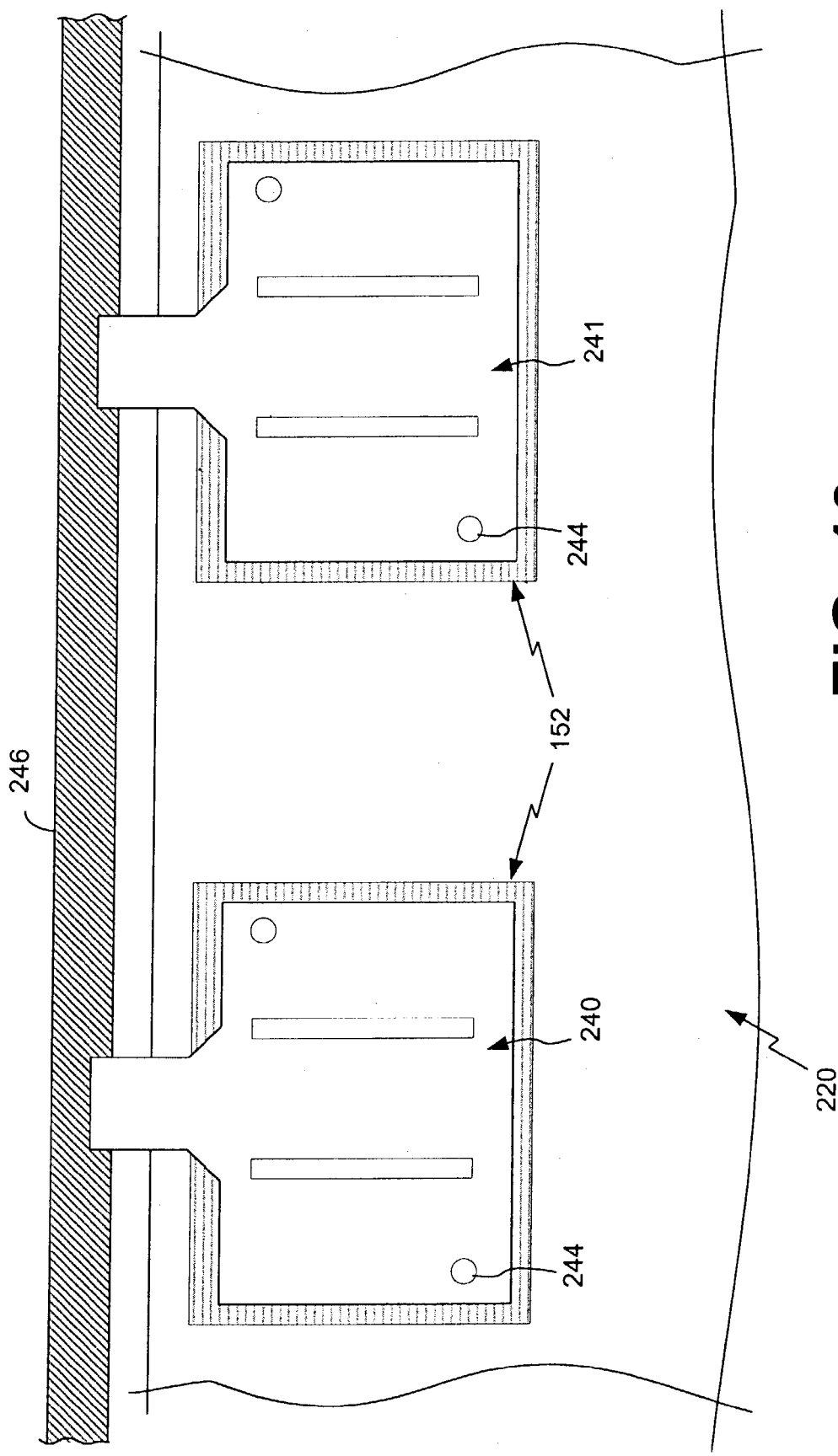
FIG. 10 depicts a simplified block diagram of the portion of the composite part and hardware shown in FIG. 9 with a restraining beam secured with the hardware.

In one embodiment, once the hardware 240, 241 is positioned, the hardware is additionally secured to a restraining beam or bar. FIG. 10 depicts a simplified block diagram of a portion of the composite part 220 and hardware 240, 241 similar to those shown in FIG. 9, along with a restraining beam 246 secured with the hardware. The restraining beam 246 aids in maintaining alignment and spacing of the hardware during further machining of the hardware and/or composite part. Typically, the restraining beam is secured with the machining tool 44.

Once the hardware is secured in position, the controller can guide the probe to again probe the composite part 220 and the hardware 240, 241 to determine precise locations, positions and thickness of the hardware. The controller can additionally and/or alternatively verify the locations to ensure accurate placement.

Figure 11:
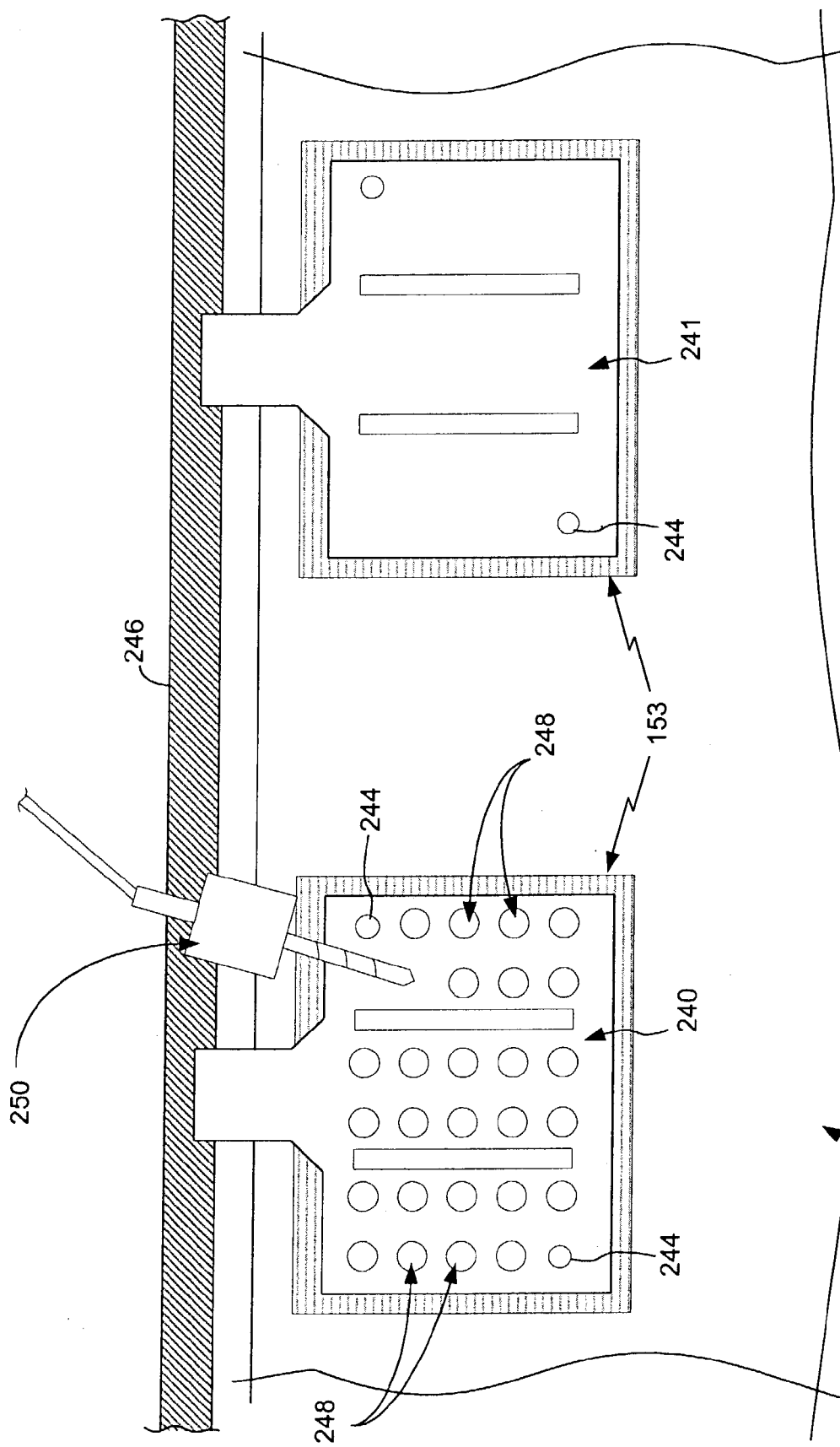
FIG. 11 depicts a simplified block diagram of the portion of the composite part and hardware shown in FIGS. 9 and 10 with a drill drilling securing holes into the hardware and composite part.

Referring to FIGS. 2, 9 and 11, once the location of the hardware is verified, the controller guides a drill 250 or other device to further machine the hardware and/or composite part. In many instances, the controller 46 guides a drill to match drill a plurality of securing holes 248 through the hardware 240, 241 and into the composite part 220 while the composite part is still in the lay-up tool 30. In one embodiment, the controller guides the drill 250 to initially drill a short pilot or center hole into the hardware 240, 241. The center hole is used to aid in maintaining the drill 250 in a strait line while drilling the securing holes. As described above, the lay-up tool 30 is typically configured to include recesses 63 (see FIGS. 3 and 4). These recesses allow the drill to pass completely through the hardware 240, 241 and if desired the composite part 220 without damaging the top plate 32 of the lay-up tool 30.

In some embodiments, the positioning holes 244 are drilled with diameters that are less than the diameters of the securing holes 248. With the plurality of securing holes drilled, two or more additional temporary fasteners can then used to secure the hardware 240, 241 with the composite part 220 using two or more of the drilled securing holes 248. The temporary fasteners in the positioning holes 244 can then be removed and the positioning holes in both the hardware and the composite part can be re-drilled to a diameter equal to the diameter of the securing holes.

During and/or following the drilling of the securing holes 248 through the hardware and the composite part, the controller can again verify the location and/or positioning of the hardware relative to the composite part 220. This ensures accurate positioning when the hardware is finally secured with the composite part using fasteners, such as bolts, rivets, pins or other fasteners during final assembly. Further, verification of the size of the drilled securing holes 248 is not required because the drill 250 is precisely controlled to ensure strait and accurate holes.

Once the hardware 240, 241 is machined in relation to the composite part 220, the hardware can be removed from the composite part to allow the composite part to be further processed and/or machined. Typically, the hardware is labeled to ensure that the correct hardware component is matched with the corresponding machined interface 152 when the hardware is finally secured onto the composite part.

Following the removal of the hardware 240, 241, the composite part 220 can be further machined and processed. The present invention allows the composite part 220 to be cut or sculpted into a desired configuration while still on the lay-up tool 30. While the lay-up tool and composite part are still secured with the machine bed 42 within the machining tool 44, the machining tool can control a cutter to cut a peripheral edge of the composite part or cut other areas of the part. Prior to cutting, the controller 46 verifies the positioning of the lay-up tool 30 and the composite part 220.

Referring to FIGS. 2 and 3 the controller guides a cutter 68 along a predefined path to cut the peripheral edge of the composite part. The controller directs the cutter 68 along the peripheral groove 62 (see FIG. 1). The cutter projects or extends into the peripheral groove 62 and engages the full thickness of the composite part 220 to cut the peripheral edge. Because the lay-up tool 30 is configured with the peripheral groove 62, the cutter extends beyond the facing surface 60 of the top plate 32 and cuts into the sacrificial material 64 within the groove 62. Again, the cutting and other machining can be achieved without having to remove the composite part 220 from the lay-up tool 30.

The composite part 220 can be, and is preferably, maintained on the lay-up tool 30 for the entire manufacturing process, thereby eliminating the usual coordination problems and alignment problems that occur when the part was moved in legacy manufacturing processes between tools for different manufacturing steps. Further, the triple purpose lay-up tool reduces errors and variations in composite part construction and assembly. Still further, the present invention reduces the manufacturing time and the additional processing to correct many of the errors resulting in previous assembly methods.

Figure 12:
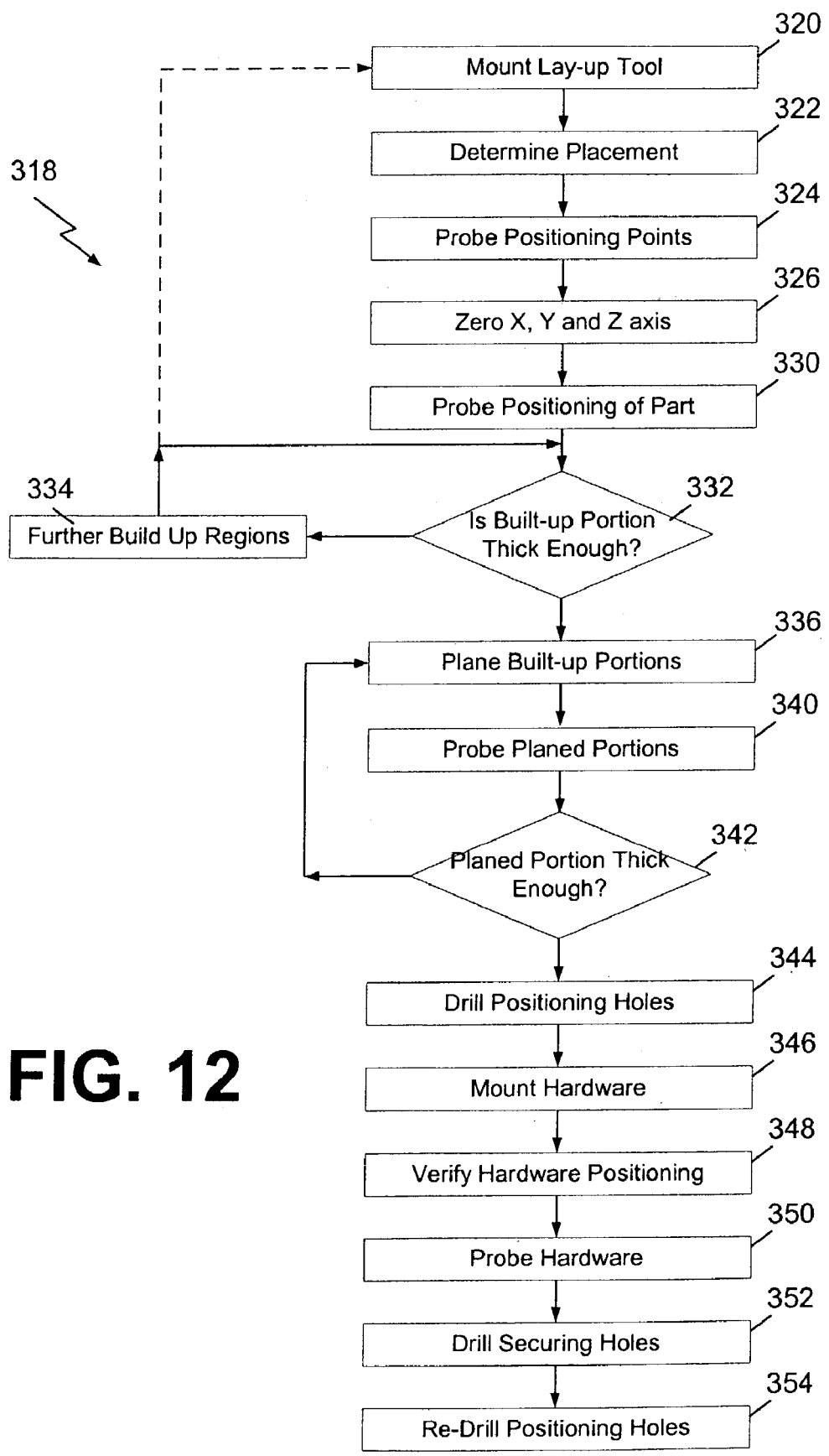
FIG. 12 depicts a simplified flow diagram of a process for positioning and machining of a composite part and hardware.

FIG. 12 depicts a simplified flow diagram of a process 318 for positioning and machining of a composite part and hardware. In step 320, a lay-up tool 30 is mounted and positioned onto a machine bed 42 of a machining tool 44 (see FIG. 2). The lay-up tool is secured in the machining tool, for example with two or more pegs inserted into peg holes and slots of the machine bed. In step 322, an approximate positioning of the lay-up tool 30 is determined based on the peg placement. In one embodiment, a controller determines the placement by sensing in the bed where the pegs are positioned. Alternatively, an operator can enter the peg positioning into the controller through a user interface.

In step 324, the controller or an operator guides a probe to probe a plurality of positioning points on the lay-up tool 30. In step 326, the controller establishes a zero reference for the X, Y and Z axis utilized in implementing control software for later machining of the composite part and/or hardware to be mounted with the part. In step 330, the controller or operator guides the probe to determine precise positioning of the composite part formed on the lay-up tool with respect to the zero reference. This includes probing sacrificial regions 153 of the composite part to be machined, and surrounding areas to determine a thickness of the sacrificial regions.

In step 332, it is verified that the thickness of the sacrificial regions exceeds a predefined minimum. If the thickness of one or more of the sacrificial regions does not exceed the minimum, the process proceeds to step 334 where one or more of the sacrificial regions not meeting the minimum are further built up. Following step 334 the process returns to step 332 (alternatively, the process returns to step 320 if the lay-up tool is removed from the tool bed to implement step 334).

If the minimum is met in step 332, step 336 is entered where the controller guides a machining tool to each sacrificial region and machines those regions to digitally defined machined interfaces 152 of a predefined contour or shape. In step 340 the controller guides the probe to again probe the sacrificial regions to ensure the machining achieved a desired thickness and/or shape. If one or more of the sacrificial regions are too thick, the process returns to step 332, other wise the process continues to step 342.

In step 342, the controller guides a drill to drill a plurality of positioning holes into predefined points of each machined interface 152. In step 344, the hardware to be mounted with the composite part is positioned over the interface. In step 346, the controller verifies the positioning of the hardware with a laser measurement tool and/or the probe. Once proper positioning is established, the hardware components are temporarily secured through the securing holes and secured to a restraining beam.

In step 350, the controller guides the probe to verify a position and thickness of the secured hardware. In step 352, the drill is guided to drill a plurality of securing holes through the hardware and the composite part. Once drilled, temporary securing devices are inserted into the securing holes and the temporary securing devices in the positioning holes are removed. In step 354, the drill is guided to drill the positioning holes to achieve a desired hole diameter. The hardware can then be removed and labeled allowing the composite part to be further processed.

In some embodiments, the lay-up tool 30 and composite part 220 can be removed from the gantry machine tool 44 following the drilling of the positioning holes 244, and prior to the drilling of further securing holes 248. Because accurate drilling of the positioning holes is achieved, the securing holes can be match drilled through both the hardware 240 and the composite part 220 by an alternate drilling machine. This allows the machine tool 44 to be freed up for the processing and machining of additional composite parts.

Additionally in some embodiments, the composite part can be removed from the lay-up tool 30 following the drilling of the positioning holes 244. Again, because of the positioning holes are typically drilled within strict predefined tolerances, hardware mounted with the composite part and secure with the positioning holes is precisely aligned within the predefined tolerances and potentially a minor amount of error. The mounting of hardware after the composite part 220 is removed from the lay-up tool is typically performed on higher tolerance hardware that allow for greater margins of positioning error. However, the margins of error are minimal, and can be further reduced with additional probing, measuring and/or aligning.

The present invention provides for a method, apparatus and system for manufacturing and constructing composite parts. Further, the present invention provides for the manufacturing and construction to be achieved in a single machining device. In some embodiments, the present invention in part employs a dual purpose lay-up tool and/or method described in U.S. Pat. No. 5,746,553, entitled DUAL PURPOSE LAY-UP TOOL, issued on May 5, 1998, which is incorporated in its entirety herein by reference. Additionally or alternatively, in some embodiments, the present invention in part utilizes a hybrid lay-up tool and/or method described in U.S. Pat. No. 6,012,883, entitled HYBRID LAY-UP TOOL, issued on Jan. 11, 2000, and U.S. Pat. No. 6,168,358, entitled HYBRID LAY-UP TOOL, issued Jan. 2, 2001, both incorporated in their entirety here in by reference.

While the invention herein disclosed has been described by means of specific embodiments and applications thereof, numerous modifications and variations could be made thereto by those skilled in the art without departing from the scope of the invention set forth in the claims.

What is claimed is:

1. A method for use in manufacturing a composite part, comprising:
    forming a composite part on a lay-up tool;
    machining a sacrificial portion of at least one portion of a first surface of the composite part to provide a machined interface while the composite part is on the lay-up tool; and
    cutting the composite part forming a peripheral edge while the composite part is on the lay-up tool.

2. The method as claimed in claim 1, further comprising:
    positioning a first hardware device in contact with the composite part; and
    drilling a plurality of positioning holes through the first hardware device and the composite part while the composite part is still on the lay-up tool.

3. The method as claimed in claim 2,
    wherein the positioning includes positioning the first hardware device on the at least one machined interface of the first surface.

4. The method as claimed in claim 1, further comprising:
    positioning a first hardware device over the machined interface.

5. A method for use in manufacturing a composite part, comprising:
    A forming a composite part on a lay-up tool including building up at least one portion of a first surface to a level greater than a surrounding portion of the first surface providing a sacrificial portion;
    machining at least a portion of the sacrificial portion while the composite part is on the lay-up tool; and
    cutting to composite part forming a peripheral edge while the composite part is on the lay-up tool.

6. The method as claimed in claim 5, farther comprises:
    probing the sacrificial portion of the first surface prior to the step of machining; and
    determining a depth at which to machine the sacrificial portion of the first surface prior to the step of machining.

7. The method as claimed in claim 6, further comprising:
    controlling the machining according to a data set having a digital definition of the composite part.

8. The method as claimed in claim 7, wherein the machining further comprising:
    guiding a machining device based on the data set to the sacrificial portion of the first surface and guiding the machining device based on the data set to machine the sacrificial portion to provide a machined interface;
    guiding a drill based on the data set to a plurality of predefined points of the machined interface and guiding the drill to drill at each of the predefined points; and
    wherein the cutting includes guiding a cutter based on the data set on a predetermined path cutting the peripheral edge.

9. A method for use in fabricating and assembling a composite part, comprising:
    molding a composite part on a lay-up tool having a desired shape;
    machining a sacrificial portion of a first surface creating a machined interface while the composite part is still on the lay-up tool;
    positioning a first hardware device in contact with the machined interface of the first surface while the composite part is still on the lay-up tool; and
    drilling a plurality of securing holes into the first hardware device and the composite part while the composite part is still on the lay-up tool.

10. The method as claimed in claim 9, further comprising:
    cutting the composite part while the composite part is still on the lay-up tool.

11. The method as claimed in claim 10, wherein the cutting includes guiding a cutter on a predefined path ad cutting the composite part.

12. The method as claimed in claim 11, wherein the guiding the cutter includes guiding the cutter with a controller operating a machine control program incorporating a data set on the predefined path around a facing surface of the lay-up tool, with the cutter cutting in a sacrificial material in the facing surface of the lay-up tool and cutting a peripheral edge of the composite part.

13. The method as claimed in claim 9, wherein the machining and the drilling include:
    guiding a machining device, with a controller operating a machine control program incorporating a data set, over the sacrificial portion of the first surface; and
    guiding a drill, with the controller, to predefined positions over the first hardware device and the composite part.

14. The method as claimed in claim 9, further comprising:
    drilling positioning holes in the machined interface prior to the positioning of the first hardware device; and
    wherein the positioning the first hardware device includes securing the first hardware device with the composite part through the positioning holes.

15. The method as claimed in claim 14, further comprising:
    further securing the first hardware device with the composite part through at least one of the plurality of drilled securing holes;
    unsecuring the first hardware device at the positioning holes; and
    drilling the positioning holes to a size equal with the plurality of securing holes.

16. The method as claimed in claim 9, further comprising:
    verifying a location of the lay-up tool prior to the machining and the drilling; and
    probing a position of the sacrificial portion of the first surface of the composite part prior to the machining and the drilling.

* * * * *